US 6,697,097 B1

(12) United States Patent
Parker et al.

(10) Patent No.: US 6,697,097 B1
(45) Date of Patent: Feb. 24, 2004

(54) SYNCHRONIZING VOICE AND VIDEO TRANSMITTED OVER SEPARATE CHANNELS

(75) Inventors: Benjamin J. Parker, Overland Park, KS (US); Shane R. Werner, Olathe, KS (US); Charles Diaz, Olathe, KS (US); Terry M. Frederick, Lenexa, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

(21) Appl. No.: 10/085,377

(22) Filed: Feb. 28, 2002

Related U.S. Application Data

(63) Continuation-in-part of application No. 10/033,813, filed on Dec. 20, 2001, and a continuation-in-part of application No. 09/978,616, filed on Oct. 16, 2001, now Pat. No. 6,545,697.

(51) Int. Cl.[7] .................................................. H04N 7/14
(52) U.S. Cl. .................................. 348/14.12; 348/14.08
(58) Field of Search ......................... 348/14.01–14.09, 348/14.1, 14.11–14.13; 370/260, 261, 352; 709/264; H04N 7/14

(56) References Cited

U.S. PATENT DOCUMENTS

| 5,689,553 | A | 11/1997 | Ahuja et al. |
| 5,764,916 | A | 6/1998 | Busey et al. |
| 5,949,763 | A | 9/1999 | Lund |
| 6,097,793 | A | 8/2000 | Jändel |
| 6,259,677 | B1 | 7/2001 | Jain |
| 6,337,858 | B1 | 1/2002 | Petty et al. |
| 6,370,137 | B1 | 4/2002 | Lund |
| 2003/0076817 | A1 * | 4/2003 | Han .......................... 370/352 |

FOREIGN PATENT DOCUMENTS

| EP | 0 721266 | | 7/1996 | |
| EP | 0 999712 | | 5/2000 | |
| EP | 1 059 798 | | 12/2000 | |
| GB | 2357659 | | 6/2001 | |
| JP | 360079887 A | * | 5/1985 | ........... H04N/7/14 |
| JP | 410242928 A | * | 9/1998 | ........... H04J/3/00 |
| JP | 2000-270307 | * | 9/2000 | ........... H04N/7/15 |
| WO | WO 01/71994 | | 9/2001 | |

* cited by examiner

Primary Examiner—Melur Ramakrishnaiah

(57) ABSTRACT

Reproduction of voice signals and video signals in a video telephony call are synchronized at the receiving end. Voice signals are transmitted from a first telephone device of a first party to a second telephone device of a second party via a public switched telephone network (PSTN) connection. The video signals are transmitted from a first computer of the first party to a second computer of the second party via packets in a computer data network. The video signals comprise successive video frames. A video latency time is determined for transmission of the video signals over the computer data network. If the video latency time is in a first predetermined range then transmission of the voice signals is delayed from the first telephone device to the second telephone device by a selected delay in response to the video latency time. The selected delay is no greater than a predetermined maximum voice delay.

19 Claims, 3 Drawing Sheets

SYNCHRONIZING VOICE AND VIDEO TRANSMITTED OVER SEPARATE CHANNELS

CROSS REFERENCE TO RELATED APPLICATIONS

The present application is a continuation-in-part of U.S. application Ser. No. 10/033,813, filed Dec. 20, 2001, entitled "Telephonic Addressing For Establishing Simultaneous Voice and Computer Network Connections", and U.S. application Ser. No. 09/978,616, filed Oct. 16, 2001 now U.S. Pat. No. 6,545,697, entitled "Video Telephony," both incorporated herein by reference in their entirety.

STATEMENT REGARDING FEDERALLY SPONSORED RESEARCH

Not Applicable.

BACKGROUND OF THE INVENTION

1. Field of the Invention

The present invention relates in general to video telephony, and, more specifically, to improving the perceived quality of a video telephony call when separate video and voice channels are used to establish the video telephony call.

2. Description of the Related Art

Internetworking (i.e., the interconnection of many computer networks) allows the interaction of very large numbers of computers and computer users. The most well known example is the Internet. As the number of users with access to the Internet has grown, so has the use of the Internet as a tool of direct person-to-person communications. Examples include IP telephony (also referred to as Voice-Over IP or VoIP) and Internet video conferencing (e.g., Microsoft NetMeeting).

Related U.S. applications Ser. No.09/978,616 and Ser. No. 10/033,813 teach a video telephony system wherein the Internet or other computer network provides a channel for carrying a video portion of a video telephony call while the POTS (plain old telephone system) or PSTN (public switched telephone network) provides a channel for carrying the voice portion of the video telephony call.

An important issue in Internet communications is the bandwidth or speed at which any particular connection operates. In the case of prior art video conferencing using the Internet, insufficiency of the bandwidth utilized for a video call has caused poor voice and picture quality. In the above video telephony system, the voice channel provides more than enough bandwidth to ensure that a good quality voice transmission is obtained. In addition, removing the voice data from the Internet transmission frees up more of the available bandwidth for the video data in that channel. Moreover, since the actual understanding of the video telephony conversations by the participants depends more on the voice signals than on the video signals, the overall satisfaction with video telephony is increased even when video quality may be somewhat lacking.

Another important issue related to bandwidth is network latency, which is the delay between when a signal is sent by the sender and when it is received by the recipient. Such delays during a two-way communication can cause unnatural conversation. In the system of the present invention wherein voice signals and video signals are delivered by separate communication channels, the further potential exists for reception of the signals to become unsynchronized.

SUMMARY OF THE INVENTION

The present invention has the advantage that the voice and video presentation at the receiving end maintains synchronization by adapting to current latency conditions.

In one aspect of the invention, a method of synchronizing reproduction of voice signals and video signals in a video telephony call comprises transmitting the voice signals from a first telephone device of a first party to a second telephone device of a second party via a public switched telephone network (PSTN) connection. The video signals are transmitted from a first computer of the first party to a second computer of the second party via packets in a computer data network. The video signals comprise successive video frames. A video latency time is determined for transmission of the video signals over the computer data network. If the video latency time is in a first predetermined range then transmission of the voice signals is delayed from the first telephone device to the second telephone device by a selected delay in response to the video latency time. The selected delay is no greater than a predetermined maximum voice delay.

DETAILED DESCRIPTION OF PREFERRED EMBODIMENTS

Figure 1:
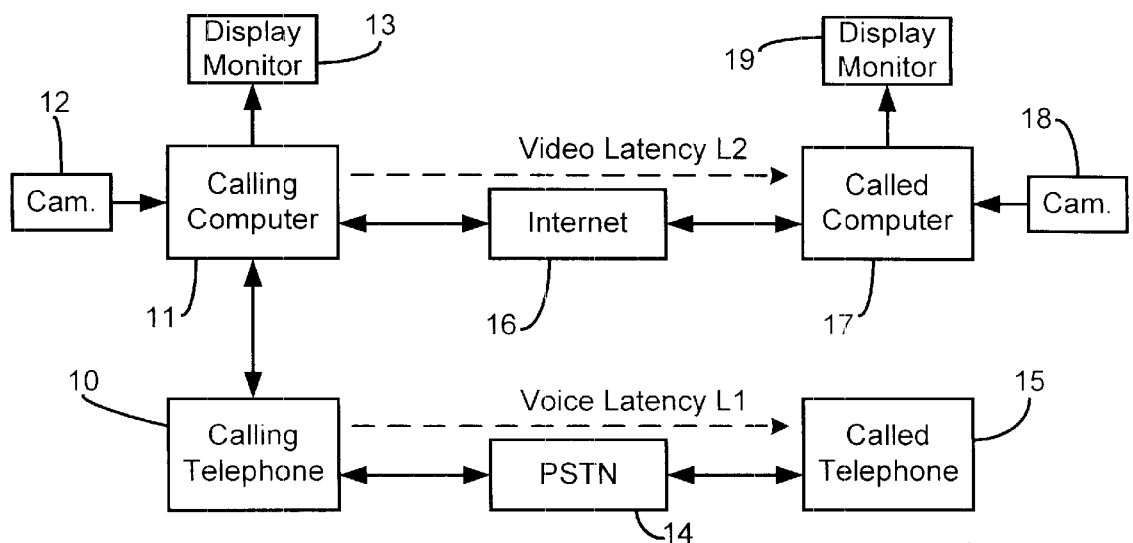
FIG. 1 is a block diagram showing the video telephony system of the present invention.

Referring to FIG. 1, user equipment for a calling party in a video telephony system includes a calling telephone 10 and a calling computer 11. Computer 11 is connected to a video camera 12 for generating video signals to be transmitted in the video portion of a video telephony call. A display monitor 13 is connected to computer 11 for displaying video signals received in the video portion of the call.

Calling telephone 10 connects via a public switched telephone network (PSTN) 14 to a called telephone 15 of a called party. Calling computer 11 connects via the Internet 16 to a called computer 17 of the called party. Computer 17 is connected to a video camera 18 and a display monitor 19.

Voice signals from calling telephone 10 to called telephone 15 traverse PSTN 14 with a voice latency L1. Video signals from calling computer 11 to called computer 17 traverse Internet 16 with a video latency L2. Based on their known relative performance, video latency L2 is always greater than or equal to voice latency L1 (and is almost always greater). Furthermore, while the voice latency stays relative fixed during a call (it depends mainly on distance of the call), the video latency call vary significantly during a call as network load rises and falls. Thus, reconstructed video images at the receiving end can become unsynchronized with the corresponding voice signals by varying degrees.

Figure 2:
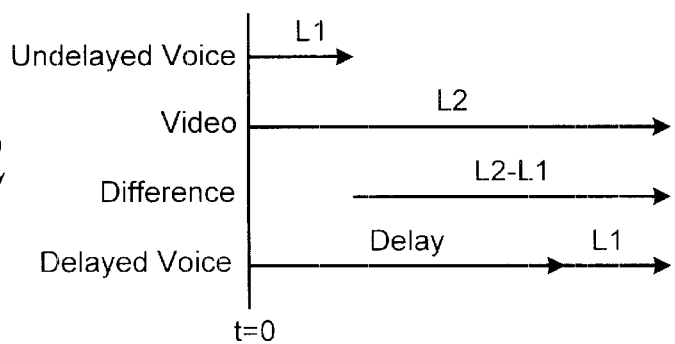
FIG. 2 is a plot showing relative latency periods and the delay introduced for the voice signals of the present invention.

The present invention solves the synchronization problem by delaying transmission of voice signals into the PSTN by an amount that causes the voice signals to arrive at the receiving end more nearly simultaneously with the corresponding video signals. As shown in FIG. 2, an undelayed voice signal has a voice latency time L1. The video signals arrive at the receiving end with a video latency time L2. The difference in latencies equals L2 minus L1. By delaying the voice signals by a delay equal to the difference L2–L1, the delayed voice signals arrive at a time comprised of the delay plus voice latency time L1. Thus, the voice signals arrive in synchrony with the video signals after a total time period equal to L2 (since the delay plus the voice latency equals L2−L1+L1).

Figure 3:
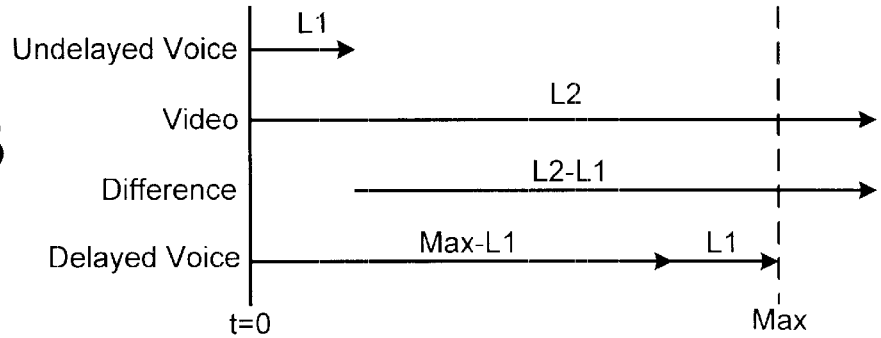
FIG. 3 is a plot showing relative latency periods and the delay introduced for the voice signals of the present invention when video latency becomes excessive.

It is known that latency of a voice telephone call above a certain threshold can lead to degradation of perceived call quality. For example, voice latencies of greater than about 100 milliseconds should normally be avoided. Therefore, the present invention preferably prevents adding delays for the voice transmission that would result in a total voice latency greater than the threshold. A predetermined maximum allowed voice latency, Max, is shown in FIG. 3, which may have a value of about 100 milliseconds. A video latency L2 has a value in FIG. 3 which is greater than maximum voice delay Max. If the delayed voice signal were to use a delay equal to the difference L2–L1, then the total effective voice latency would exceed Max. In order to keep the total voice latency below predetermined maximum voice latency Max, the added delay must not be allowed to exceed the difference between maximum voice latency Max and voice latency L1.

Figure 4:
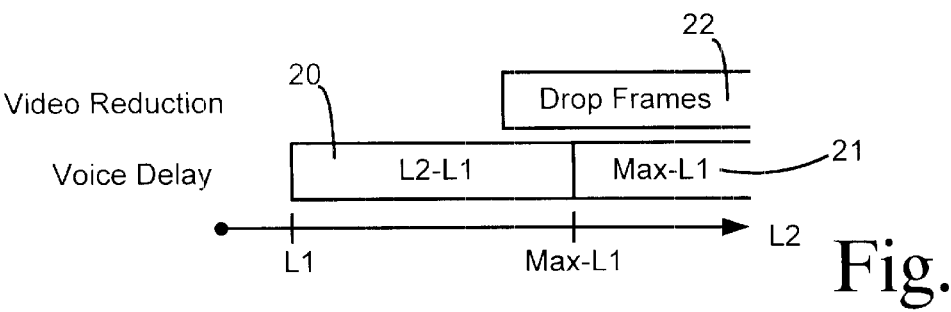
FIG. 4 is a chart relating a determined value of the video latency to the remedial actions taken by the present invention.

FIG. 4 summarizes the actions taken to maintain synchronization in response to a current value of the video latency L2. When the video latency L2 is in a first range 20 between about L1 and about Max-L1, then a voice delay is added which is equal to video latency time L2 minus voice latency time L1. When L2 is in region 21 (i.e., above range 20), then the added voice delay is equal to about Max-L1.

When the video latency time L2 becomes greater than predetermined maximum voice delay Max, then the preferred embodiment can no longer maintain exact synchronization. In order to minimize the fall behind of the video portion of the video telephony call, on embodiment of the invention takes the further step of reducing the information content of the video signals when the video latency time L2 is in a second range 22 (FIG. 4) in order to expedite reception of succeeding video frames. The reduced information content can be obtained by dropping video frames from the transmitted signal, applying a greater compression ratio to the data, and/or reducing the resolution or screen size of the video frames. By sending less video data to the recipient, it is possible to favorably impact the network latency due to the overall traffic reduction in a particular path through the network.

Since voice latency is generally much smaller than video latency and since voice latency is substantially fixed, it is sufficient for purposes of the present invention to estimate its value as a constant. For instance, the estimate can be based on distance between the endpoints of the telephone call. In one embodiment, the estimate can be based on the area codes for the calling and called parties. Since voice latency will often be extremely short, it is also possible to estimate voice latency time as zero.

Video latency is preferably determined in real time. In one embodiment, time clocks in the calling computer and the called computer are synchronized. Then at least some of the network packets sent from one computer to the other are timestamped as they are being sent into the network. Once the packets are received, the time within a timestamp is compared with the time on the synchronized clock computer clock to determine the latency. It is known in the art to synchronize clocks in networked computers using the Network Time Protocol (NTP), for example.

In another embodiment for determining video network latency, a round trip time of a sequential message between the two computers can be measured and then divided in half. Thus, a "ping" message is sent from a first computer to a second computer. The second computer receives the first ping message after a network latency period L2 and immediately responds to the first computer with a second ping message. If not responding immediately, then the second computer may include in the second ping message an identification of the length of the delay between receiving the first ping message and sending the second ping message back to the first computer. When the first computer receives the second ping message, it determines video latency L2 in response to the time elapsed between sending the first ping message and receiving the second ping message. Specifically, L2 may be equal to about one-half of the elapsed time (not including any identified delay in the second computer).

Figure 5:
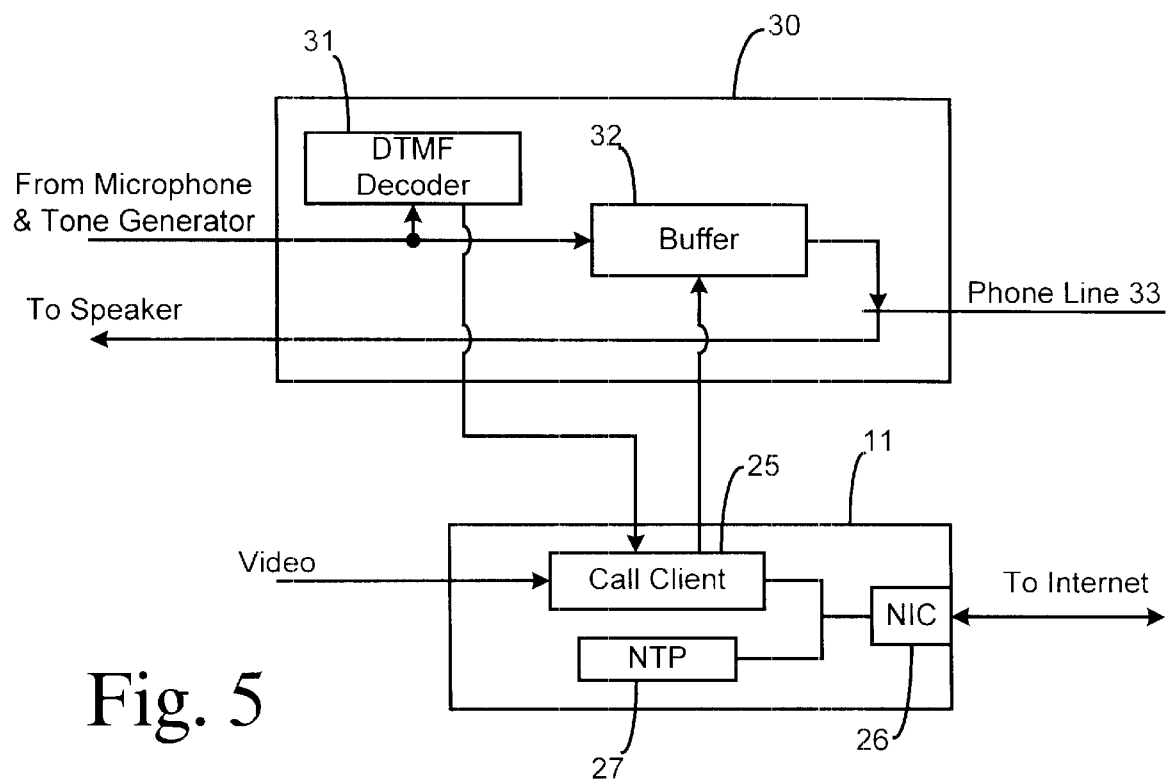
FIG. 5 is a block diagram showing user equipment for a video telephony call using the present invention.

Specific hardware for implementing the present invention is shown in FIG. 5. Computer 11 includes a call client 25 which performs such functions as identifying the called telephone number, forwarding a call request to a central server which completes a video telephony call, and conducting a video packet exchange during a video telephony data call. Thus, call client 25 handles the network transmission of live video images from a video camera coupled to the computer and the reception and displaying of live video images sent from the other user. Computer 11 includes a network interface controller (NIC) 26 for coupling computer 11 to the Internet via a broadband DSL connection or a similar connection.

A voice unit 30 may be integrated within a conventional telephone or may be an add-on device for connecting to a conventional telephone for performing specialized functions according to the present invention. A DTMF decoder 31 is coupled to an outgoing signal line of a telephone which carries voice signals from a microphone (not shown) and dialing tones from a tone generator (not shown). It detects and converts a dialed telephone number into an electronic (e.g., digital) representation of the dialed telephone number. This representation is coupled to call client 25 for forwarding on to the central server to initiate a video call in the computer network, as described in the related applications mentioned above.

Voice unit 30 further includes a buffer 32 having a variable length for selecting from a plurality of signal delays for signals passing through buffer 32. Call client 25 preferably performs the determination of a delay as shown and described in connection with FIGS. 2–4. Once a delay is determined, it is provided from call client 25 to buffer 32 in the form of a control signal for implementing the corresponding delay. After delaying voice signals by a commanded time delay, the delayed voice signals are coupled to a phone line 33 for transmission to the other party. To keep the delayed voice signals from coupling to the speaker of the local telephone, a duplex coil (not shown) may be used to couple the voice signals to phone line 33 as is known in the art.

To determine video network latency, computer 11 includes a network time protocol application for communicating with a similar application on the other party's remote computer and, if necessary, a time server connected to the Internet. Alternatively, the use of ping messages can be performed by call client 25 to determine the video latency (e.g., periodically throughout a video call).

Figure 6:
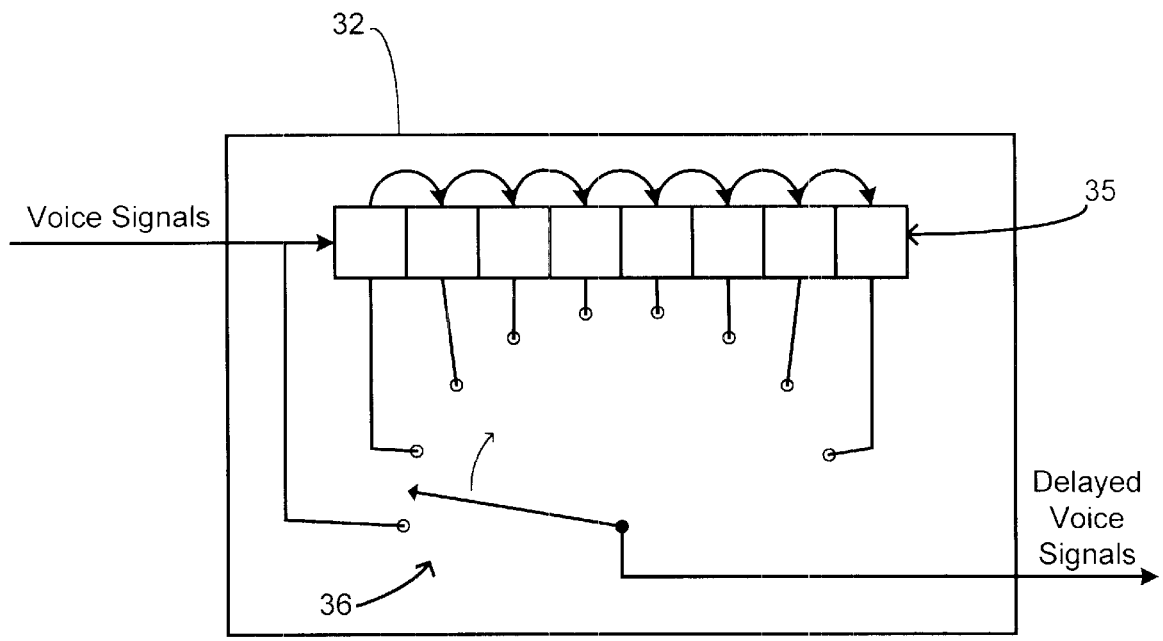
FIG. 6 is a schematic diagram showing the buffer of FIG. 5 in greater detail.

FIG. 6 shows buffer 32 in greater detail. The voice signals are input into a series of unit delay blocks 35. A multiplex switch 36 is set by the control signal to a desired position in order to obtain a predetermined delay.

Figure 7:
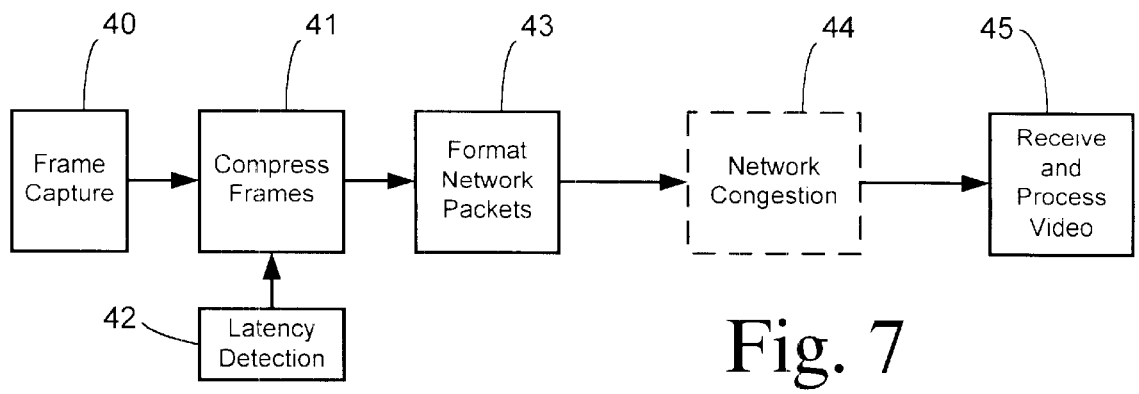
FIG. 7 is a block diagram showing the flow of video data signals.

FIG. 7 illustrates the progression of video date signals in the present invention. Video frames are captured one at a time in a block 40. A captured frame is compressed in a block 41. Video latency times are detected in block 42. Provided that normal video latency times are experienced (i.e., less than range 22 in FIG. 4), a default compression is used (e.g., a standard resolution). The default compression may preferably involve creating base frames and difference frames wherein a base frame includes full detail of a frame and difference frames include only portions of a frame that change from frame to frame. After a predetermined number of difference frames have been transmitted, another base frame is sent.

Compressed video frame signals are formatted for transmission as network packets in a block 43. When video latency determined in block 42 reaches the second range, then the video information from block 41 that is formatted for transmission in block 43 is reduced. When dropping frames, preferably the difference frames are dropped first. If video latency fails to improve sufficiently, then difference frames are also dropped. Information content is also reduced by reducing resolution as previously described.

Packets formatted in block 43 are sent to a network block 44 (e.g., Internet) which may be subject to network congestion which affects the video latency time L2. Finally, the video signals are received and processed by the recipient in block 45. By adaptively adjusting the amount of video data being sent in response to the detected latency, latencies great enough to prevent voice synchronization can be avoided.

Figure 8:
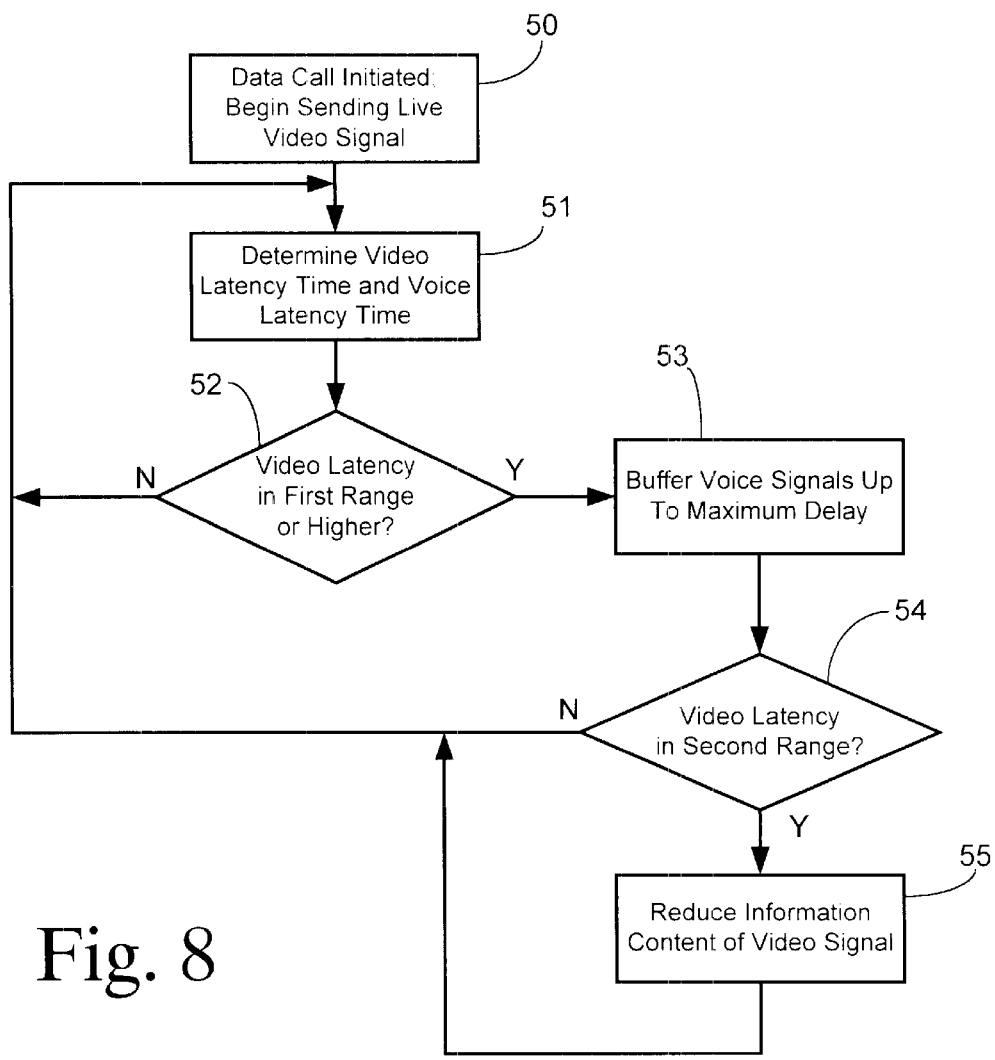
FIG. 8 is a flowchart showing a preferred embodiment of the present invention.

A method of the present invention is shown in FIG. 8. A data call is initiated in step 50 and the calling and called computers may begin sending a live video signal. In step 51, at least one of the computers determines video latency time and voice latency time (i.e., each party is responsible for synchronizing their voice and video signals). In step 52, a check is made to determine whether video latency L2 is in the first range or higher. If it is not, then voice delay is turned off and a return is made to step 51 to re-determine the video latency. If it is, then buffering of voice signals at a corresponding delay (up to the maximum delay) is turned on in step 53.

Next, a check is made in step 54 to determine whether video latency L2 is in the second range. The second range may include only values above the first range or may include an overlap at the upper end of the first range. If not in the second range, then any previous reduction in video content is turned off and a return is made to step 51 to redetermine the video latency. If it is in the second range, then the information content of the video signal is reduced in step 55 as appropriate.

What is claimed is:

1. A method of synchronizing reproduction of voice signals and video signals in a video telephony call, said method comprising the steps of:

transmitting said voice signals from a first telephone device of a first party to a second telephone device of a second party via a public switched telephone network (PSTN) connection;

transmitting said video signals from a first computer of said first party to a second computer of said second party via packets in a computer data network, said video signals comprising successive video frames;

determining a video latency time for transmission of said video signals over said computer data network;

determining a voice latency time for transmission of said voice signals over said PSTN connection; and if said video latency time is in a first predetermined range then delaying transmission of said voice signals from said first telephone device to said second telephone device by a selected delay in response to said video latency time, said selected delay being no greater than a predetermined maximum voice delay;

wherein said first predetermined range is between said voice latency time and said predetermined maximum voice delay.

2. The method of claim 1 wherein said selected delay is no greater than a difference between said predetermined maximum voice delay and said voice latency time.

3. The method of claim 2 wherein if said video latency time is in said first predetermined range then said selected delay is substantially equal to said video latency time minus said voice latency time.

4. The method of claim 1 wherein if said video latency time is above said first predetermined range then delaying transmission of said voice signals by a difference between said predetermined maximum voice delay and said voice latency time.

5. The method of claim 1 wherein said voice latency time is a preselected constant.

6. The method of claim 5 wherein said preselected constant is substantially equal to zero.

7. The method of claim 1 wherein said predetermined maximum voice delay is equal to about 100 milliseconds.

8. The method of claim 1 wherein said step of delaying transmission of said voice signals is comprised of diverting said voice signals through a buffer having a length controlled in response to said selected delay.

9. The method of claim 1 wherein said step of determining said video latency time is comprised of:

synchronizing first and second clocks in said first and second computers, respectively;

timestamping at least some of said packets; and comparing a timestamp of a received packet with a time when said received packet is received.

10. Video telephony apparatus for conducting a video telephony call with a remote apparatus, wherein said video telephony apparatus transmits voice signals via a public switched telephone network (PSTN) connection and transmits video signals via packets in a computer data network, said video telephony apparatus comprising:

a telephone device coupled to said PSTN connection for transmitting voice signals to said remote apparatus, said telephone device adapted to selectably delay said voice signals in response to a control signal;

a video device for generating said video signals as successive video frames; and a computer device coupled to said video device and to said computer data network for transmitting said video signals to said remote apparatus via said computer data network, wherein said computer device and said remote apparatus have respective private IP addresses within said computer data network;

wherein said computer device establishes a data call between said computer apparatus and said remote computer, determines a video latency time for transmission of said video signals to said remote apparatus over said computer data network, and generates said control signal in order to select a delay in response to said video latency time being in a first predetermined range; and wherein said computer device determines a voice latency time for transmission of said voice signals over said PSTN connection, wherein said first predetermined range is between said voice latency time and a predetermined maximum voice delay, and wherein said selected delay is not substantially greater than a difference between said predetermined maximum voice delay and said voice latency time.

11. The video telephony apparatus of claim 10 wherein if said video latency time is in said first predetermined range then said selected delay is substantially equal to said video latency time minus said voice latency time.

12. The video telephony apparatus of claim 10 wherein said computer device is further adapted to reduce an information content of said transmitted video signals in order to expedite reception of succeeding frames if said video latency time is in a second predetermined range at least partly greater than said first predetermined range.

13. The video telephony apparatus of claim 12 wherein said reduced information content is comprised of removing selected video frames from said transmitted video signals.

14. The video telephony apparatus of claim 10 wherein said telephone device comprises a buffer responsive to said control signal.

15. A telephone device in a voice path for a video telephony system wherein voice signals are transmitted between a calling party and a called party via a public switched telephone network (PSTN) connection with a voice latency time and video signals are transmitted between a computer of said calling party and a computer of said called party via packets in a computer data network with a video latency time, said telephone device comprising:

a capture circuit for capturing telephone dialing tones and providing a captured telephone number to said computer of said calling party; and a buffer for providing a selectable delay for said voice signals transmitted to said called party in said voice path in response to a control signal from said computer of said calling party in order to synchronize said voice signals and said video signals as presented to said called party, wherein said selectable delay is controlled to a selected delay in response to said video latency time being in a first predetermined range, wherein said selected delay is no greater than a predetermined maximum voice delay, and wherein said first predetermined range is between said voice latency time and said predetermined maximum voice delay.

16. A method of synchronizing reproduction of voice signals and video signals in a video telephony call, said method comprising the steps of:

transmitting said voice signals from a first telephone device of a first party to a second telephone device of a second party via a public switched telephone network (PSTN) connection;

transmitting said video signals from a first computer of said first party to a second computer of said second party via packets in a computer data network, said video signals comprising successive video frames;

determining a video latency time for transmission of said video signals over said computer data network;

if said video latency time is in a first predetermined range then delaying transmission of said voice signals from said first telephone device to said second telephone device by a selected delay in response to said video latency time, said selected delay being no greater than a predetermined maximum voice delay; and if said video latency time is in a second predetermined range at least partly greater than said first predetermined range, then reducing an information content of said transmitted video signals in order to expedite reception of succeeding frames.

17. The method of claim 16 wherein said reduced information content is comprised of removing selected video frames from said transmitted video signals.

18. The method of claim 16 wherein said reduced information content is comprised of reducing a resolution of said transmitted video signals.

19. A method of synchronizing reproduction of voice signals and video signals in a video telephony call, said method comprising the steps of:

transmitting said voice signals from a first telephone device of a first party to a second telephone device of a second party via a public switched telephone network (PSTN) connection;

transmitting said video signals from a first computer of said first party to a second computer of said second party via packets in a computer data network, said video signals comprising successive video frames;

determining a video latency time for transmission of said video signals over said computer data network; and if said video latency time is in a first predetermined range then delaying transmission of said voice signals from said first telephone device to said second telephone device by a selected delay in response to said video latency time, said selected delay being no greater than a predetermined maximum voice delay;

wherein said step of determining said video latency time comprises sending a first ping message from said first computer to said second computer, said second computer receiving said first ping message and immediately responding to said first computer with a second ping message, and said first computer receiving said second ping message and determining said video latency time in response to a time elapsed between sending said first ping message and receiving said second ping message.

* * * * *